April 13, 1937.  J. E. FULWEILER  2,076,815
SEPARATING SYSTEM AND METHOD
Filed Feb. 7, 1934  3 Sheets—Sheet 1

INVENTOR
JOHN EDWIN FULWEILER
BY
ATTORNEY

April 13, 1937.  J. E. FULWEILER  2,076,815
SEPARATING SYSTEM AND METHOD
Filed Feb. 7, 1934  3 Sheets-Sheet 2
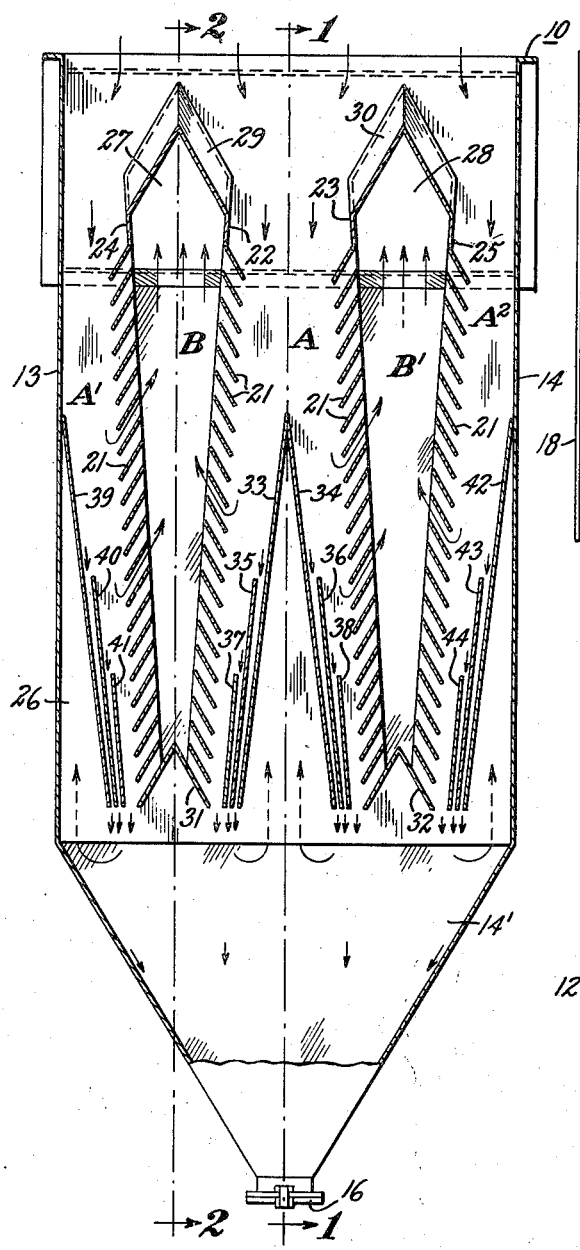
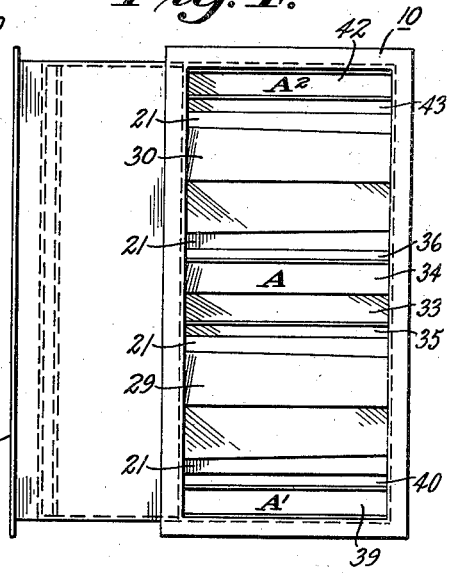
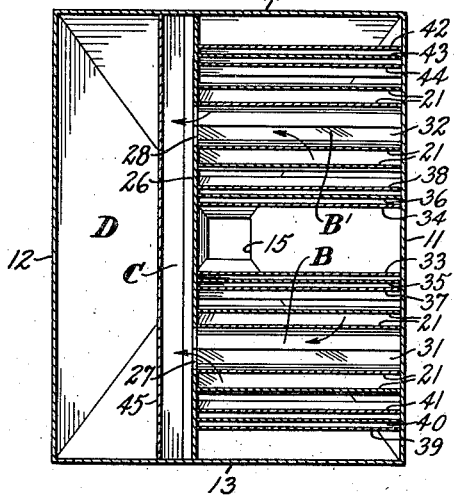
INVENTOR
JOHN EDWIN FULWEILER
BY
ATTORNEY April 13, 1937.　　　J. E. FULWEILER　　　2,076,815
SEPARATING SYSTEM AND METHOD
Filed Feb. 7, 1934　　　3 Sheets-Sheet 3
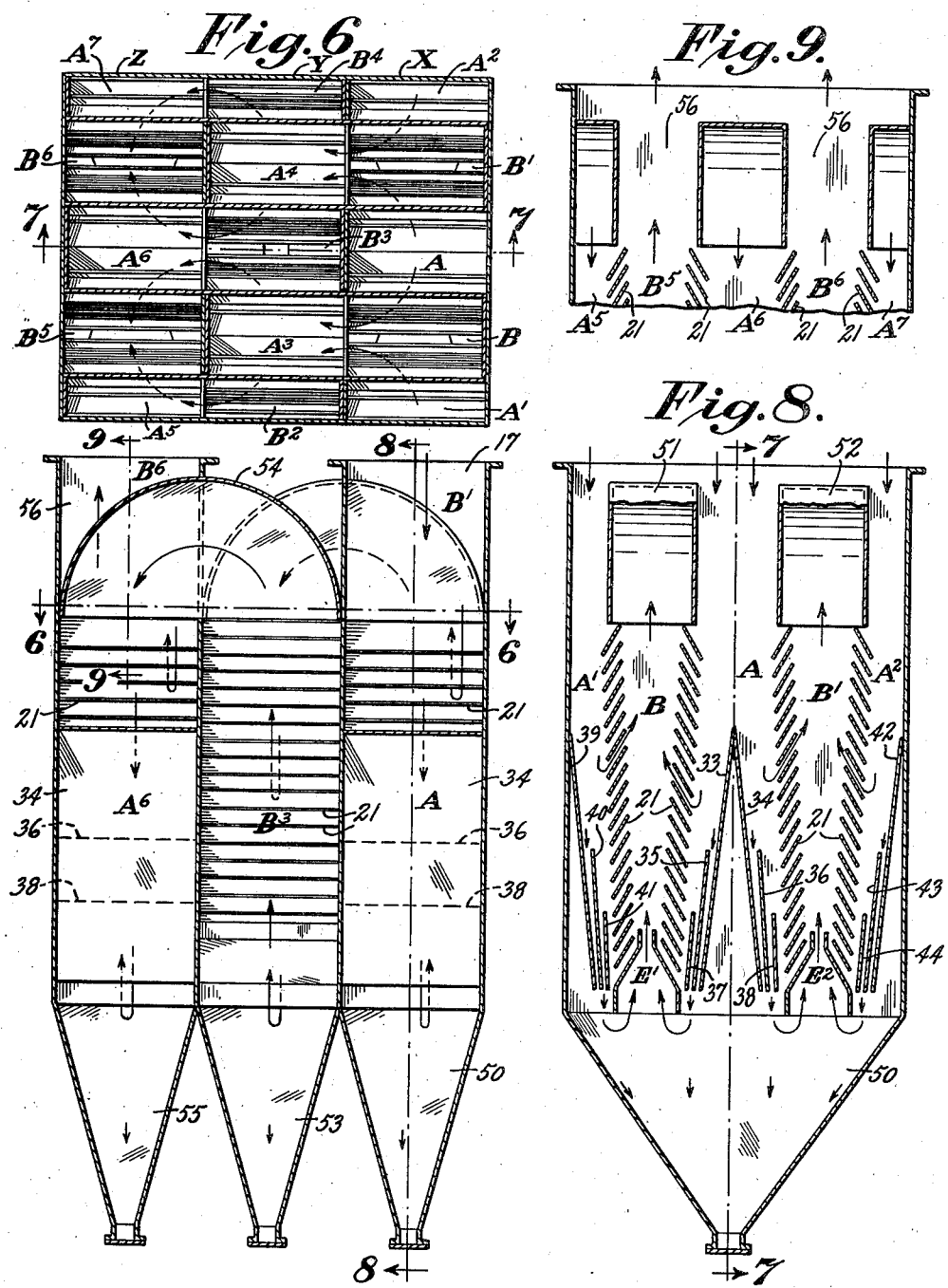
INVENTOR
JOHN EDWIN FULWEILER
BY
ATTORNEY Patented Apr. 13, 1937

2,076,815

REISSUED

UNITED STATES PATENT OFFICE 2,076,815

SEPARATING SYSTEM AND METHOD

John Edwin Fulweiler, New York, N. Y.

Application February 7, 1934, Serial No. 710,056

25 Claims. (Cl. 183—75)

This invention relates to separating methods and systems and more particularly pertains to the separation of gases and solid matter carried by the gases in suspension.

Separations of this character have heretofore been effected in order to collect the solid matter or to purify the gases in which the solids are carried by a separation of the solid matter from a portion of the gases carrying the same and a concentration of these solids into another portion of the gases, accompanied by a freeing of the clean gases, followed by the separation of the solids from the portion of the gases into which they have been concentrated and the collection of the solids. The systems utilized for accomplishing these separations have been objectionable because the equipment had to be of comparatively great size to obtain high efficiency, or the equipment has been so complicated in design as to be impractical because of its high cost or the concentration of the solids in part of the carrying gases has been so low as to render the system inefficient.

The present invention overcomes these objections to prior systems and provides a novel separating method which may be practiced in equipment of the baffle type which achieves a high initial concentration of the solids, is compact in form and economical to manufacture and operate, and is capable of being assembled with separator units of the same design to provide variations in capacity. The units may also be assembled so as to provide a plurality of stages in series to treat gases carrying extremely fine dusts.

In accordance with the invention, the gases and solids are separated by causing the gases to make an abrupt change in direction of flow, augmented by the fact that this directional flow change is from a downward to an upward direction thereby utilizing the force of gravity in addition to the momentum of the dust particles in resisting the change of direction and further augmented by the fact that the velocity of the flow of the gases in the original downward direction is considerably in excess of the velocity of flow in the changed or upward direction. More specifically, the downward flow of the gases carrying the solids is through a path of gradually decreasing flow area so that the velocity of the solid or dust particles is substantially undiminished. The change of direction of flow is accomplished by means of one or more tiers of straight, spaced baffle plates, resembling when assembled, the common form of Venetian blind. The tiers of baffle plates are disposed in a vertical or nearly vertical position with the faces of the plates so disposed that the gases are caused to make an abrupt change in the direction of flow from a downward to an upward direction, preferably on the order of 330° from the original downward direction but I do not wish to be limited to this value. The total flow area of the space between the baffle plates in the tiers of each flow path is made considerably larger than the flow area of the path inlet thereby providing for an abrupt decrease in velocity at the moment of the change in direction of flow of the gases. The hopper for collecting the separated solids or dust is disposed directly below the lower end of the downward path or paths of flow so that the flow path of the average dust or solid particle is continuous in substantially the same direction from its entrance into the separator until it is deposited in the hopper. If desired, a plurality of spaced plates may be provided in the downward paths of flow to provide a reduction in flow area for the gases and also to provide traps for the solids separated from the gases and for delivering these solids to the hopper. The use of tiers of straight, spaced baffle plates is advantageous because of the simplicity of construction and the readiness with which such construction lends itself to a multiplication of separating units either for series or parallel flow, thereby affording great variation in capacity and making it possible to handle large volumes of gases within comparatively small spaces and at the expense of comparatively small pressure drops.

The nature of the invention will be understood from the following description considered in connection with the accompanying drawings forming a part thereof and in which:

Fig. 3 is a vertical sectional view taken substantially on line 3—3 of Fig. 1;

Fig. 4 is a top plan view of the apparatus shown in Figs. 1 to 3;

Fig. 5 is a transverse sectional view taken on line 5—5 of Fig. 1;

Fig. 6 is a transverse sectional view taken substantially on line 6—6 of Fig. 7 and illustrating another form of the invention assembled in a plurality of separator units connected in series;

Fig. 7 is a vertical sectional view taken substantially on line 7—7 of Fig. 6;

Fig. 8 is a vertical sectional view taken on line 8—8 of Fig. 7; and

Fig. 9 is a partial vertical sectional view taken on line 9—9 of Fig. 7.

Like characters of reference designate like or similar parts throughout the several views.

Figure 1:
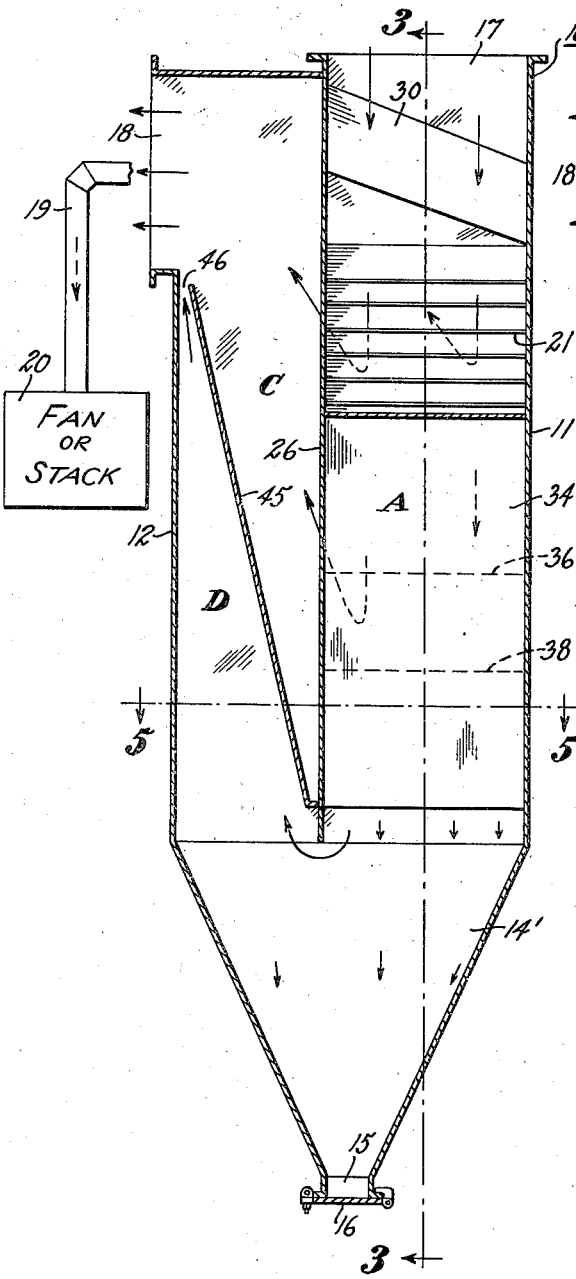
Fig. 1 is a vertical sectional view of one form of apparatus embodying the present invention and taken substantially on line 1—1 of Fig. 3.
Figure 2:
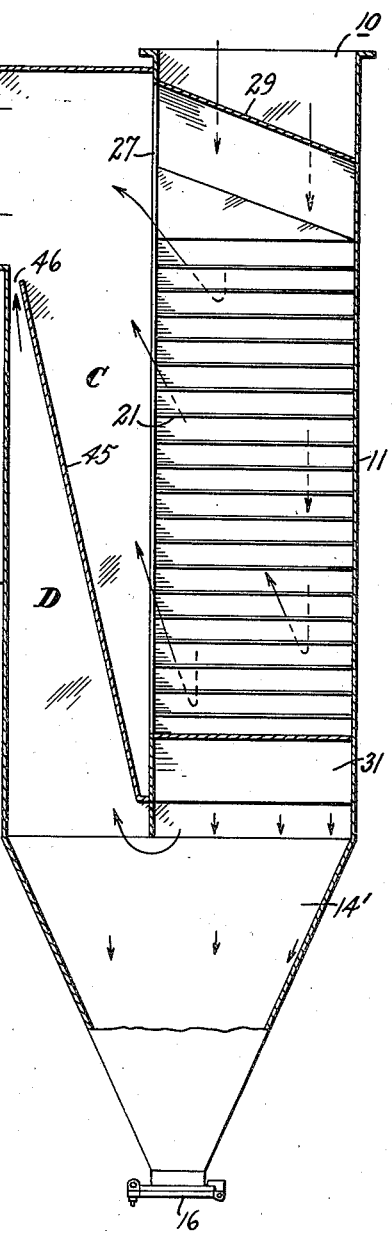
Fig. 2 is a vertical sectional view taken on line 2—2 of Fig. 3.

Referring to Figs. 1 to 5 of the drawings, the separator therein disclosed includes a casing designated generally 10 having a front wall 11, a rear wall 12 and side walls 13 and 14. These walls are preferably arranged at right angles to each other to provide a rectangular separator casing. The lower ends of the aforementioned walls of the casing converge to form a hopper 14' having an outlet 15 at the bottom thereof which is controlled by a suitable valve 16. The casing is provided with an inlet 17 at its upper end and adjacent the front wall 11, as shown, and with an outlet 18 at the upper end of the casing in the rear wall 12. The outlet 18 may be connected by a conduit 19 to an induced draft fan or a stack designated 20 to cause the gases to flow through the casing from the outlet to the inlet, or the gases may be forced through the casing by a fan or other suitable means connected to the inlet.

A plurality of straight baffle plates 21 are disposed in spaced relationship along the front wall 11 of the casing as shown and are arranged in a plurality of vertically inclined tiers designated 22, 23, 24, and 25. These baffles 21 in each tier extend from the front wall 11 to an intermediate wall 26 which extends between the side walls 13 and 14 parallel to the front and rear walls and from the upper end of the casing to the top of the hopper 14'. Wall 26 is provided with wedge-shaped openings 27 and 28 located between the tiers 22, 24 and 23, 25. The baffles 21 in each of the tiers are disposed in parallel relationship and are arranged so that their faces are inclined to the vertical. The tiers 22 and 23, as clearly shown in Fig. 3, are vertically inclined so that their upper ends or the ends adjacent the inlet 17 are disposed more closely together than their lower ends. The tier 24 is vertically inclined so that its upper end is disposed more closely to the side wall 13 than the lower end and tier 25 is vertically inclined so that its upper end is closer to the side wall 14 than its lower end. Each of the tiers or baffles extends from a point somewhat below the top of the casing 10 to a point somewhat above the top of the hopper 14'. The upper ends of the tiers 22 and 24 are connected by an inverted V-shaped horizontally inclined hood 29 and the upper ends of tiers 23 and 25 are connected by a similar hood 30 similarly disposed. As indicated more clearly in Figs. 1, 2, and 3, the hoods 29 and 30 are disposed somewhat below the upper end of casing 10, and extend from the intermediate wall 26 to the front wall 11. An inverted V-shaped plate 31 is disposed at the lower ends of tiers 2 and 24 somewhat above the upper end of hopper 14' and extends from the intermediate wall 26 to the front wall 11, and a similar plate 32 is disposed at the lower ends of tiers 23 and 25 above hopper 14' and between the walls 26 and 11.

The tiers of baffles 22 and 23 together with the walls 11 and 26 form a vertically downward inlet path of flow designated A for the gases and solids entering the separator. The tier 24 together wide side wall 13 and walls 11 and 26 forms another vertically downward path of flow designated A¹ and the tier 25 together with the side wall 14 and the walls 11 and 26 forms still another vertically downward path of flow designated A². Suitable means such as the plates shown and disposed in each of the inlet paths of flow A, A¹, and A², restrict these paths so as to provide flow paths of gradually diminishing areas of flow from the upper ends of these plates to the upper end of the hopper 14'. Plates 33 and 34 are disposed in the path A with their upper ends in contact at a point centrally of the path A and below the upper ends of the tiers 22 and 23 and with their lower ends spaced apart above the upper end of hopper 14'. These plates 33 and 34 extend between walls 11 and 26. Shorter plates 35 and 36 are disposed alongside of the plates 33 and 34 in spaced relationship thereto, and extend between the walls 11 and 26 and have their upper ends disposed farther from the plates 33 and 34 respectively than their lower ends. Plates 37 and 38, shorter than plates 35 and 36 are disposed alongside of the latter in spaced relationship thereto and between the walls 11 and 26 and have their upper ends disposed farther from the plates 35 and 36 than their lower ends. Plates 39, 40 and 41 disposed in path A¹, are similar to plates 34, 36 and 38 respectively, and are disposed with reference to the tier of baffles 24 similarly to the disposition of the plates 34, 36, and 38 with respect to the tier of baffles 23. Plates 42, 43, and 44 in path A² are disposed with respect to the tier of baffles 25 similarly to the disposition of the plates 33, 35, and 37 respectively, with respect to the tier of baffles 22.

In the form of apparatus shown in Figs. 1 to 5, the outlet passage for the gases passing between the baffles 21 from each of the inlet paths, consists of two parts which for convenience are designated B and C. The spaces defined between the tiers of baffles 22 and 24 constitute the part B of the outlet passage, the spaces between the tiers of baffles 23 and 25 constitute another and parallel part B, designated B¹, and the space defined by the intermediate wall 26, side walls 13 and 14, and the vertically inclined wall 45 extending between the side walls 13 and 14 and from the lower ends of the plates 31 and 32 at the bottoms of the tiers of baffles to a point adjacent the lower part of the outlet 18 in the rear wall 12, constituting the part C. The upper end of plate 45 is spaced from the rear wall 12 so as to provide an outlet 46 for the hopper outlet passage D defined by the plate 45, rear wall 12 and side walls 13 and 14. This hopper outlet passage D is of gradually diminishing flow area from the upper end of the hopper to the outlet 46.

The operation of this form of apparatus is as follows: Gases laden with dust or solid particles from any source are introduced into the inlet 17 at the upper end of the separator and after the stream of gases has been divided by the hoods 29 and 30, the divided streams flow into the inlet paths of flow A, A¹ and A². In their downward flow through these paths, parts of the several streams are continuously withdrawn between the baffles 21 in the tiers 22, 23, 24, and 25 into the parts B and B¹ of the outlet paths whence they flow into the part C thereof and out of the separator through the outlet 18 to the fan or stack connected therewith, or to the point of disposal.

In their downward flow through the inlet paths A, A¹ and A², the solid or dust particles are concentrated into a relatively very small portion of the carrying gases due to the separation of part of the gases from each of the downwardly flowing streams and the solids carried thereby by reason of the withdrawal of the separated gas portions between the baffles of the several tiers and further due to the fact that the velocity of the downwardly moving solid or dust particles is maintained at a substantially constant speed throughout the length of inlet flow paths by reason of the gradually diminishing area of flow through which these particles pass. Some of the particles flowing downwardly in the several streams are trapped between adjacent plates indicated 33 to 44 inclusive and flow downwardly in the spaces between these plates to the hopper 14' together with the relatively small quantity of gas carrying them. The gas flowing into the hopper from the several inlet paths of flow together with the solids concentrated therein are separated from these solids by reason of the fact that the gases are caused to abruptly change their direction of flow in the upper part of the hopper from a downward direction to an upward direction, after which these gases enter the hopper outlet gas passage D and flow through this passage to the outlet 46 thereof and through the outlet 18 of the separator apparatus. Any solid particles remaining in suspension in the gases flowing from the hopper through the outlet passage D are removed therefrom prior to reaching the outlet 46 and drop back into the hopper.

Figs. 6 to 9 inclusive illustrate a multi-stage separator embodying the invention. A three-stage separator is shown in these figures but it will be understood that any desired number of stages may be employed. For convenience, the stages have been designated X, Y, and Z which indicate respectively the first, second and third stages of the separator. In general, each of the stages is similar to the single-stage separator shown in Figs. 1 to 5 with the exception that the outlet passage C and the hopper outlet passage D together with the vertically inclined plate 45 is not employed, nor are the inverted V-shaped hoods, such as 27 and 30 utilized.

The arrangement of the tiers of baffles and the plates in the inlet paths of flow of the first stage are similar to the arrangement shown in Figs. 1 to 5 so as to provide three vertically downward inlet paths of flow designated A, $A^1$, and $A^2$ and two vertically upward outlet paths of flow designated B and $B^1$. The relatively small volume of gases carrying the solids which enter the hopper 50 of the first stage make an abrupt change in direction of flow from a vertically downward to a vertically upward direction and are conducted into the outlet paths of flow B and $B^1$ respectively through the hopper outlets $E^1$ and $E^2$. As shown, these hopper outlets, or vents, are in the form of inverted elongated funnels which extend the width of the baffle plates 21 thereby providing an outlet path of flow for the gas from the hopper to the outlet paths B and $B^1$ of gradually diminishing cross-sectional area of flow. The gases moving upwardly through the paths B and $B^1$ are conducted to the inlet paths of flow $A^3$ and $A^4$ of the second stage by any suitable means such as the semicircular plates 51 and 52 shown. The arrangement of the several parts of the second stage is similar to the arrangement of the first stage except that in the second stage two inlet paths of flow $A^3$ and $A^4$ are provided with three outlet paths of flow designated $B^2$, $B^3$, and $B^4$. In this stage the gases and solids carried thereby from the first stage flow vertically downward through the inlet paths and vertically upward through the outlet paths after passing between the baffles and the relatively small volume of gases which enter the hopper 53 of the second stage after abruptly changing their direction of flow, enter the outlet paths through hopper outlets of gradually diminishing area of flow similar to the outlets $E^1$ and $E^2$ of the first stage. The gases and solids flowing upwardly through the outlet paths of the second stage are conducted by suitable means such as the semicircular plates 54 to the inlet paths of flow of the third stage Z. The third stage is identical with the first stage in that it is provided with three vertically downward inlet paths of flow designated $A^5$, $A^6$, and $A^7$ and two vertically upward paths of flow designated $B^5$ and $B^6$. The gases and solids carried thereby which enter the inlet paths of the third stage from the second stage flow vertically downward through the inlet paths and the gases which flow between the baffle plates in the several tiers and thereby caused to abruptly change their direction, enter the outlet paths $B^5$ and $B^6$ and flow vertically upward. The gases entering the hopper 55 of the third stage after abruptly changing their direction of flow, pass into the outlet paths through hopper outlets similar to the outlets $E^1$ and $E^2$ of the first stage. The gases are discharged from the outlet paths of the third stage through outlets 56. These outlets 56 may be connected to a stack or induced draft fan which will cause the gases to flow through the several stages as described or the gases may be forced through by means of a fan or the like connected to the inlet. It is desirable that each of the several stages be provided with its own hopper for collecting the separated solids or dust because of the difference in pressure existing in each of the several stages. The multi-stage series arrangement of the separators of the present invention is particularly useful for the treatment of gases carrying extremely fine dust.

In accordance with the present invention a separating system for the separation of gases from dust or solids carried thereby is provided which is entirely assembled excepting for the curved plates 51, 52, and 54 in the multi-stage series arrangement, from straight plates of any suitable material. As a result of this construction, great compactness is obtained with low cost of manufacture and high efficiency of operation. With the present invention it has been found possible to concentrate the solids carried by the gases which enter the separator into about five percent of the total volume of gas.

If desired, the baffle plates 21 instead of being flat as illustrated in the drawings may be given a slight transverse bend or curvature in order to stiffen the plates and to assist in the separation of the solids from the gases. Where the baffle plates are so curved, the axis of curvature will lie in a horizontal plane and the baffles will be disposed in the tiers with their concave sides facing in a downward direction. The word "straight" as used in the claims in connection with the baffles or baffle plates is intended to include baffle plates curved in this or a similar manner.

Inasmuch as variations in the separation process herein disclosed or in the several steps thereof as well as in the forms of the illustrated apparatus may be made without departing from the principle of the invention, it will be understood that there is no intention to limit the invention except by the scope of the claims hereto appended.

What I claim is:

1. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form an inlet flow path from the inlet to the hopper in a vertically downward direction, means in the inlet flow path to provide a diminishing flow area for the gases and solids passing therethrough, said baffle plates being arranged and disposed so that the total flow area between said plates is considerably greater than the flow area of the flow path inlet and so that the gases in flowing from the inlet path and between the baffles to the outlet make an abrupt change in their direction of flow from a downward to an upward direction.

2. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form an inlet flow path from the inlet to the hopper in a vertically downward direction, means in the inlet flow path to provide a diminishing flow area for the gases and solids passing therethrough, said baffle plates being arranged and disposed so that the total flow area between said plates is considerably greater than the flow area of the flow path inlet and so that the gases in flowing from the inlet path and between the baffles to the outlet make an abrupt change in their direction of flow from a downward to an upward direction, and means providing a diminishing area of flow for the gases passing from the hopper to the outlet.

3. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form an inlet flow path from the inlet to the hopper in a vertically downward direction, plates in the inlet flow path to provide a diminishing flow area for the gases and solids passing therethrough, said baffle plates being arranged and disposed so that the total flow area between said plates is considerably greater than the flow area of the flow path inlet and so that the gases in flowing from the inlet path and between the baffles to the outlet make an abrupt change in their direction of flow from a downward to an upward direction.

4. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form an inlet flow path from the inlet to the hopper in a vertically downward direction, means in the inlet flow path to provide a diminishing flow area for the gases and solids passing therethrough, and for trapping solids flowing through the inlet path and delivering them to the hopper, said baffle plates being arranged and disposed so that the total flow area between said plates is considerably greater than the flow area of the flow path inlet and so that the gases in flowing from the inlet path and between the baffles to the outlet make an abrupt change in their direction of flow from a downward to an upward direction.

5. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form a plurality of inlet flow paths from the inlet to the hopper in a vertically downward direction, means in said inlet flow paths to provide a diminishing flow area for the gases and solids passing through each path, said baffle plates being arranged and disposed so that the total flow area between the baffle plates at the side of each of said paths is considerably greater than the flow area of the inlet of said paths and so that the gases in flowing from each of the inlet paths and between the baffles to the outlet make an abrupt change in their direction of flow from a downward to an upward direction.

6. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form a plurality of inlet flow paths from the inlet to the hopper in a vertically downward direction, means in said inlet flow paths to provide a diminishing flow area for the gases and solids passing through each path, said baffle plates being arranged and disposed so that the total flow area between the baffle plates at the side of each of said paths is considerably greater than the flow area of the inlet of said paths and so that the gases in flowing from each of the inlet paths and between the baffles to the outlet make an abrupt change in their direction of flow from a downward to an upward direction, and means providing a diminishing area of flow for the gases passing from the hopper to the outlet.

7. Apparatus for separating solids from gases carrying the same, comprising a casing having an inlet and an outlet, means causing the gases introduced into the casing to flow therethrough, a hopper at the bottom of the casing in which the solids separated from the carrying gases are collected, a plurality of substantially straight, spaced baffle plates disposed in the casing so as to form a plurality of inlet flow paths from the inlet to the hopper in a vertically downward direction, plates in said inlet flow paths to provide a diminishing flow area for the gases and solids passing through each path, said baffle plates being arranged and disposed so that the total flow area between the baffle plates at the side of each of said paths is considerably greater than the flow area of the inlet of said paths and so that the gases in flowing from each of the inlet paths and between the baffles to the outlet make an abrupt change in their direction of flow from a downward to an upward direction.

8. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form a plurality of inlet flow paths from the inlet to the hopper in a vertically downward direction, means in said inlet flow paths to provide a diminishing flow area for the gases and solids passing through each path and for trapping solids flowing through the inlet paths and delivering them to the hopper.

9. Apparatus for separating solids from gases carrying the same comprising a casing having an inlet and an outlet at the upper part of the casing, means causing the gases introduced into the casing to flow therethrough, a hopper at the bottom of the casing in which the solids separated from the carrying gases are collected, a plurality of substantially straight, spaced baffle plates disposed in the casing so as to form an inlet flow path from the inlet to the hopper in a vertically downward direction and the initial portion of an outlet path in a vertically upward direction from the baffle plates to the outlet, a plurality of spaced plates in the inlet flow path to provide a diminishing flow area for the gases and solids passing through said path and for trapping solids flowing through the inlet path and delivering them to the hopper, said baffle plates being arranged and disposed so that the total flow area between said plates is considerably greater than the flow area of the path inlet and so that the gases in flowing from the inlet path and between the baffles to the outlet path make an abrupt change in their direction of flow from a downward to an upward direction, and means providing a flow path of diminishing flow area for the gases which enter the hopper from the inlet path and from the hopper to the outlet.

10. Apparatus for separating solids from gases carrying the same, comprising a casing having an inlet and an outlet, means causing the gases introduced into the casing to flow therethrough, a hopper at the bottom of the casing in which the solids separated from the carrying gases are collected, a plurality of substantially straight, spaced baffle plates disposed in the casing so as to form an inlet flow path from the inlet to the hopper in a vertically downward direction, and an outlet flow path in a vertically upward direction, means in the inlet flow path to provide a diminishing flow area for the gases and solids passing therethrough, said baffles being arranged and disposed so that the total flow area between said plates is considerably greater than the flow area of the inlet and so that the gases in flowing from the inlet path and between the baffles to the outlet path make an abrupt change in their direction of flow from a downward to an upward direction, and means providing a path of flow of diminishing area for conducting the gases which enter the hopper from the inlet path to the outlet.

11. Apparatus for separating solids from gases carrying the same comprising a plurality of separator units, each comprising a casing having an inlet and an outlet, a hopper at the bottom of the casing, a plurality of straight, spaced baffle plates disposed in the casing to provide an inlet flow path from the inlet to the hopper and an outlet flow path from the hopper to the outlet, means in the inlet flow path for providing a diminishing area of flow for the gases and solids passing therethrough, said baffle plates being arranged and disposed to provide a total flow area between the plates which is considerably greater than the flow area of the path inlet and so that the gases in passing from the inlet path and between the baffles to the outlet path make an abrupt change in their direction of flow from a downward to an upward direction, means providing a path of flow of diminishing area for conducting the gases which enter the hopper from the inlet path to the outlet path of flow, and means connecting the outlet of one separator unit with the inlet of another.

12. Apparatus for separating solids from gases carrying the same comprising a plurality of separator units, each comprising a casing having an inlet and an outlet, a hopper at the bottom of the casing, a plurality of straight, spaced baffle plates disposed in the casing to provide a plurality of inlet flow paths from the inlet to the hopper and a plurality of outlet flow paths from the hopper to the outlet, a plurality of spaced plates in each of the inlet flow paths for providing a diminishing area of flow for the gases and solids passing through said paths and for trapping solids flowing through said paths and delivering them to the hopper, said baffle plates being arranged and disposed to provide a total flow area between the plates in each inlet path which is considerably greater than the flow area of the inlet to each path and so that the gases in passing from each inlet path and between the baffles to each outlet path make an abrupt change in the direction of flow from a downward to an upward direction, means providing a converging path of flow for conducting the gases which enter the hopper from the inlet path to each outlet path of flow and means connecting the outlet of one separator unit with the inlet of another.

13. The method of separating solids and gases carrying the same which comprises the steps of flowing a stream of the gases carrying the solids in a vertically downward direction in a path of flow of diminishing flow area, continuously separating from said stream a portion of the gases flowing downwardly and causing the gases so separated to abruptly change their direction of flow from a downward to an upward direction whereby the solids carried by the gases are concentrated into a relatively small portion of the gases, causing the solids and the gases into which they are concentrated to flow into a collecting zone wherein the solids are separated from the gases and conducting the gases from the collecting zone through a path of flow of diminishing flow area.

14. The method of separating solids and gases carrying the same which comprises the steps of flowing a plurality of streams of the gases carrying the solids in a vertically downward direction in paths of flow of diminishing flow area, continuously separating from each of said streams a portion of the gases flowing downwardly and causing the gases so separated to abruptly change their direction of flow from a downward to an upward direction whereby the solids carried by each of the streams of gases are concentrated into a relatively small portion of the gases of each stream, causing the solids and the gases into which they are concentrated to flow into a collecting zone wherein the solids are separated from the gases and conducting the gases from the collecting zone through a path of flow of diminishing flow area.

15. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of tiers of substantially straight, spaced baffle plates disposed in the casing so as to form a straight inlet flow path from the inlet to the hopper in a vertically downward direction, said baffle plates being arranged and disposed so that the total flow area between said plates is considerably greater than the flow area of the flow path inlet and so that the gases in flowing from the inlet path and between the baffles to the outlet make an abrupt change in their direction of flow from a downward to an upward direction.

16. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of substantially straight, spaced baffle plates disposed in the casing so as to form a straight inlet flow path from the inlet to the hopper in a vertically downward direction, means in the inlet flow path to provide a diminishing flow area for the gases and solids passing therethrough, said baffle plates being arranged and disposed so that the total flow area between said plates is considerably greater than the flow area of the flow path inlet and so that the gases in flowing from the inlet path and between the baffles to the outlet make an abrupt change in their direction of flow from a downward to an upward direction.

17. Apparatus for separating solids from gases carrying the same, comprising a casing having an inlet and an outlet, means causing the gases introduced into the casing to flow therethrough, a hopper at the bottom of the casing in which the solids separated from the carrying gas are collected, a plurality of tiers of substantially straight, spaced baffle plates disposed in the casing so as to form a straight inlet flow path from the inlet to the hopper in a vertically downward direction, said baffle plates being arranged and disposed so that the gases in flowing from the inlet path and between the baffles to the outlet make an abrupt change in their direction of flow from a downward to an upward direction.

18. The method of separating solids and gases carrying the same which comprises the steps of flowing a stream of the gases carrying the solids in a vertically downward direction in a straight path of flow of diminishing flow area, continuously separating from said stream a portion of the gases flowing downwardly and causing the gases so separated to abruptly change their direction of flow from a downward to an upward direction whereby the solids carried by the gases are concentrated into a relatively small portion of the gases, causing the solids and the gases into which they are concentrated to flow into a collecting zone without changing their general direction of flow wherein the solids are separated from the gases and conducting the gases from the collecting zone through a path of flow of diminishing flow area.

19. Apparatus for separating solids from gases carrying the same, comprising a casing having an inlet and an outlet, means causing the gases introduced into the casing to flow therethrough, a hopper at the bottom of the casing in which the solids separated from the carrying gas are collected, and spaced tiers of baffles in the casing bounding oppositely disposed portions of an inlet flow path from the inlet to the hopper in a vertically downward direction, said baffles being arranged and disposed so that the gases in flowing from the inlet path and between the baffles to the outlet make an abrupt change in their direction of flow from a downward to an upward direction.

20. Apparatus for separating solids from gases carrying the same, comprising a casing having an inlet and an outlet, means causing the gases introduced into the casing to flow therethrough, a hopper at the bottom of the casing in which the solids separated from the carrying gas are collected, and spaced tiers of straight, spaced baffles in the casing bounding oppositely disposed portions of an inlet flow path from the inlet to the hopper in a vertically downward direction, said baffles being arranged and disposed so that the gases in flowing from the inlet path and between the baffles to the outlet make an abrupt change in their direction of flow from a downward to an upward direction.

21. Apparatus for separating solids from gases carrying the same, comprising a casing having an inlet and an outlet, means causing the gases introduced into the casing to flow therethrough, a hopper at the bottom of the casing in which the solids separated from the carrying gas are collected, spaced tiers of baffles in the casing bounding oppositely disposed portions of an inlet flow path from the inlet to the hopper in a vertically downward direction, said baffles being arranged and disposed so that the gases in flowing from the inlet path and between the baffles to the outlet make an abrupt change in their direction of flow from a downward to an upward direction, and means providing a diminishing area of flow for the gases passing from the hopper to the outlet.

22. Apparatus for separating solids from gases carrying the same comprising a plurality of separator units, each comprising a casing having an inlet and an outlet, a hopper at the bottom of the casing, a plurality of spaced tiers of baffles in the casing bounding oppositely disposed portions of inlet flow paths from the inlet to the hopper in vertically downward directions, said baffles being arranged and disposed so that the gases in passing from the inlet path and between the baffles to the outlet path make an abrupt change in their direction of flow from a downward to an upward direction, and means connecting the outlet of one separator unit with the inlet of another.

23. Apparatus for separating solids from gases carrying the same, comprising a casing having an inlet and an outlet, means causing the gases introduced into the casing to flow therethrough, a hopper having its inlet connected with the casing and in which the solids separated from the carrying gas are collected, and spaced tiers of baffles in the casing providing a plurality of inlet flow paths from the inlet to the hopper, the baffles being arranged and disposed so that the gases in flowing from the inlet path and between the baffles to the outlet make an abrupt change in their direction of flow to thereby free the gases from the solid matter carried thereby.

24. Apparatus for separating solids from gases carrying the same, comprising a casing having an inlet and an outlet, means causing the gases introduced into the casing to flow therethrough, a hopper having its inlet connected with the casing and in which the solids separated from the carrying gas are collected, and spaced tiers of straight, spaced baffles in the casing providing a plurality of inlet flow paths from the inlet to the hopper, the baffles being arranged and disposed so that the gases in flowing from the inlet path and between the baffles to the outlet make an abrupt change in their direction of flow to thereby free the gases from the solid matter carried thereby.

25. Apparatus for separating solids from gases carrying the same, comprising a casing having an inlet and an outlet, means causing the gases introduced into the casing to flow therethrough, a hopper having its inlet connected with the casing and in which the solids separated from the carrying gas are collected, and spaced tiers of straight, spaced baffles in the casing providing an inlet flow path from the inlet to the hopper, the baffles being arranged and disposed so that the gases in flowing from the inlet path and between the baffles to the outlet make an abrupt change in their direction of flow to thereby free the gases from the solid matter carried thereby.

JOHN EDWIN FULWEILER.